United States Patent [19]
Fink

[11] Patent Number: 5,146,368
[45] Date of Patent: Sep. 8, 1992

[54] OPTICAL PATH LENGTH MULTIPLICATION SYSTEM

[75] Inventor: David Fink, Los Angeles, Calif.

[73] Assignee: The United States of America as represented by the Secretary of the Air Force, Washington, D.C.

[21] Appl. No.: 696,379

[22] Filed: May 6, 1991

Related U.S. Application Data

[63] Continuation of Ser. No. 546,494, Jun. 29, 1990, abandoned.

[51] Int. Cl.$^5$ .............................................. G02B 5/08
[52] U.S. Cl. .................................... 359/861; 359/865
[58] Field of Search ...................... 350/618, 622, 626; 359/857, 861, 865

[56] References Cited

U.S. PATENT DOCUMENTS 2,881,663 11/1956 Dearborn ............................ 350/622
3,995,944 12/1976 Queeney ............................. 350/622

FOREIGN PATENT DOCUMENTS 57-60607 12/1982 Japan ................................. 350/622
8809521 12/1988 PCT Int'l Appl. ................. 350/622
0176440 11/1965 U.S.S.R. ............................. 350/622

*Primary Examiner*—Bruce Y. Arnold
*Assistant Examiner*—R. D. Shafer
*Attorney, Agent, or Firm*—Irwin P. Garfinkle; Donald J. Singer

[57] ABSTRACT

This disclosure describes an optical system which serves to multiply the change in the path length of an optical system. The system employs an even number of pairs of mirrors which are displaceable along a line or lines parallel to an axis. Each segment of the optical path is between mirrors which are oppositely displaceable, so that the length of each segment is increased by an amount equal to twice the displacement of the mirror pairs.

1 Claim, 3 Drawing Sheets

OPTICAL PATH LENGTH MULTIPLICATION SYSTEM

STATEMENT OF GOVERNMENT INTEREST

The invention described herein may be manufactured and used by or for the Government for governmental purposes without the payment of any royalty thereon.

This application is a continuation of application Ser. No. 07/546,494, filed Jun. 29, 1990, now abandoned.

This invention relates to an optical system used in large array phased telescopes, and it serves to substantially double the amount of piston control that can be added to the system's optical path without increasing the number of mirrors, the number of driven elements, or the range or bandwidth of the piston drive. Further, the system does not require angular realignment during piston sweep, nor is there any angular or translational motions of the input and output beams. In addition, the design of the system does not increase the optical flux loading on the mirrors with multiple passes, and it is also reactionless.

BACKGROUND OF THE INVENTION

Prior art geometry is shown in FIGS. 2, 3 and 4. These geometries use two pairs of mirrors which when moved apart on a common axis or on parallel axes, increase the optical path length by a factor of two times the change in the distance between the mirror assemblies. As shown, the prior art uses parallel paths to avoid tilting and translation of the beam. The prior art geometries have been realized either using mirror assemblies having two mirrors or a corner cube assembly. In either case the optical path length increases as the two assemblies are moved apart is two times the change in distance between the assemblies. In accordance with the present invention, the optical path length change can be double that of the prior art without adding optical elements.

SUMMARY AND OBJECTS OF THE INVENTION

This invention serves to substantially double the change in the path length of an optical system over that obtained by the prior art when translating the system mirrors to increase or decrease path length.

It is an object of this invention to substantially double the amount of piston control that can be added to an optical path without increasing the number of mirrors, the number of driven elements, or the range or bandwidth of the piston drive, without requiring angular realignments during the piston sweep, without any angular or translational motions of the input and out beams, and without increasing the optical flux loading on the mirrors with multiple passes.

BRIEF DESCRIPTION OF THE DRAWINGS

For other objects and advantages of this invention reference should now be made to the following specification and to the accompanying drawings, in which.

DETAILED DESCRIPTION OF THE INVENTION

Figure 1:
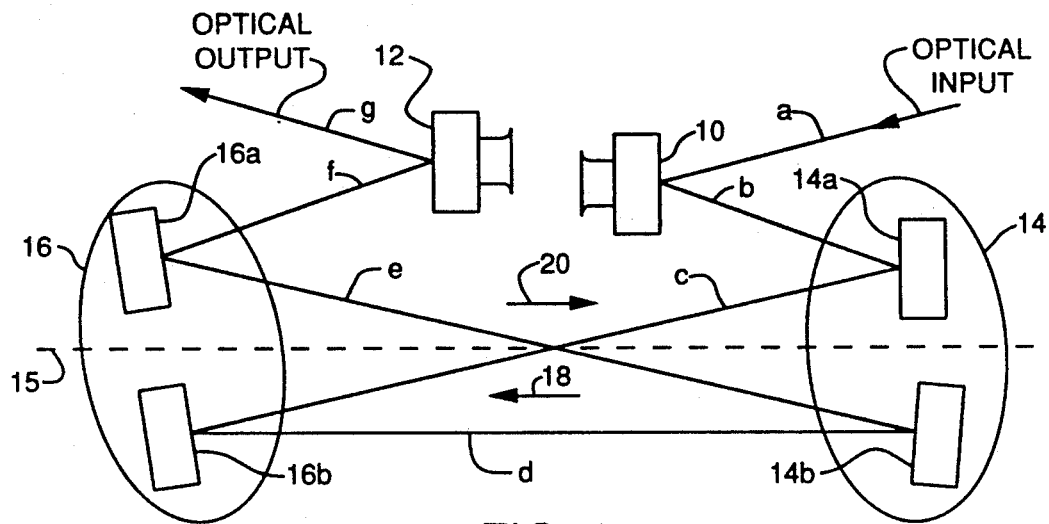
FIG. 1 is a schematic representation of one embodiment of this invention.

One embodiment of the invention is shown in FIG. 1 and consists of a planar input mirror 10, and a planar output mirror 12 which are spatially fixed. In addition, there are two mirror assemblies 14 and 16 having pairs of opposing mirrors 14a and 16a, 14b and 16b. The mirrors 14a and 14b are fixed with respect to one another, but moveable on an axis 15 either in the direction of the arrow 18 or the arrow 20. Similarly the mirrors 16a and 16b are fixed with respect to one another, but are also moveable on the axis 15 either in the direction of the arrows 18 or 20. In operation, pairs of opposing mirrors 14a, 16a and 14b, 16b on the mirror assemblies 14 and 16 move in opposite directions either away from one another, or towards one another.

The mirrors are positioned so that there is an optical path which includes path segments a to g. The segment a is the optical input to the input mirror 10; segment b is from the input mirror 10 to the mirror 14a; c is from the mirror 14a to the mirror 16b; segment d is from mirror 16b to mirror 14b; segment e is from mirror 14b to mirror 16a; segment f is from the mirror 16a to the output mirror 12; and segment g is the output segment.

When the mirror assemblies 14 and 16 and their paired opposing mirrors are simultaneously moved in opposite directions along the axis 15, the length of each of the four segments b to f is changed, and therefore the total length of the optical path is changed by an amount equal to four times the change in the distance between the mirror assemblies. Thus if the mirror assemblies are moved apart, the path length b to f is increased by a factor of four; if the mirror assemblies 14 and 16 are moved toward one another the path length is decreased by a factor of four. The factor of four results because movement of each of the mirror assemblies affects four path segments; that is, movement mirror assembly 14 affects path segments b, c, d and e, while movement of mirror assembly 16 affects path segments c, d, e and f. Therefore, the displacement of mirror assembly 14 changes each of the path lengths of the four segments b to e by an amount equal to the displacement of the assembly 14, while the displacement of the mirror assembly 16 similarly changes each of the path lengths of the four segments c to f by an amount equal to the displacement of the assembly 16 making the total increase (or decrease) equal to four times the displacement of assembly 14 plus four times the displacement of assembly 16, which is also equal to four times the relative displacement of the two mirror assemblies.

Figure 2:
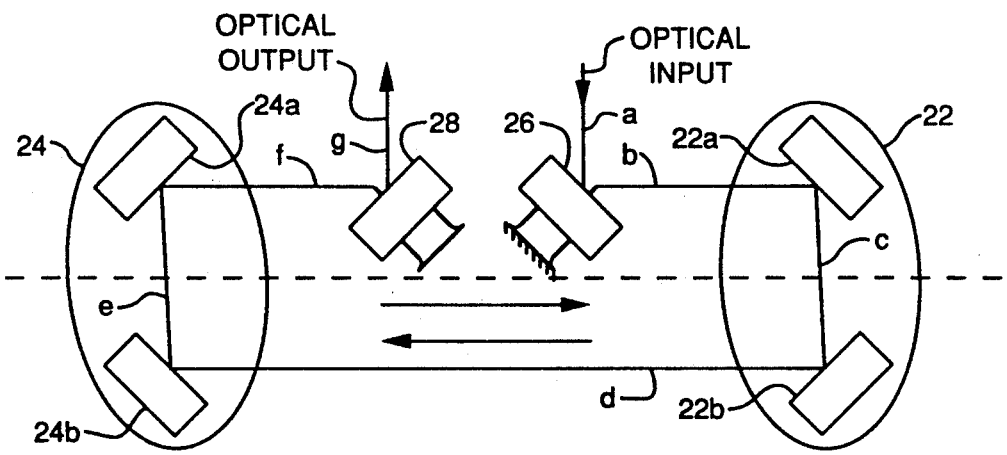
FIGS. 2, 3 and 4 are schematic representations of prior optical systems over which this invention is an improvement.

The optical geometry illustrated in FIG. 1 (and in the variations described below) is in contrast to the prior art geometry of FIGS. 2, 3 and 4. In the geometry of FIG. 2, two pairs of moveable mirrors 22 and 24 are shown in combination with fixed input and output mirrors 26 and 28, respectively. As in FIG. 1, the input and output mirrors 26 and 28 are spatially fixed, while the pairs of mirrors 22 and 24 are moveable either toward or away from each other on a common axis 30.

An optical input applied to the input mirror 26 travels in a rectilinear path which includes segments a–g, that is, the optical signal travels to the input mirror 26 along path segment a, and from the input mirror 26 along path segment b to the mirror 22a, then along path segment c to the mirror 22b. From there the signal travels along path segment d to the mirror 24b, and then to the mirror 24a along path segment e. The signal then travels along path segment f to the output mirror where it exits the system along path segment g. Unlike the inventive geometry illustrated in FIG. 1, when the mirrors 22 and 24 are moved in opposite directions along the axis 30, the length of the path is increased (or decreased) by only a factor of two, whereas in FIG. 1, the displacement of the assemblies changes the total length of the path by a factor of four. This is because in the prior art, two of the path segments c and e are not altered when the pairs of mirrors 22 and 24 are translated on axis 30, whereas in FIG. 1, all four of the segments in the path between the input mirror 10 and the output mirror 12 are increased or decreased by the translation.

Figure 3:
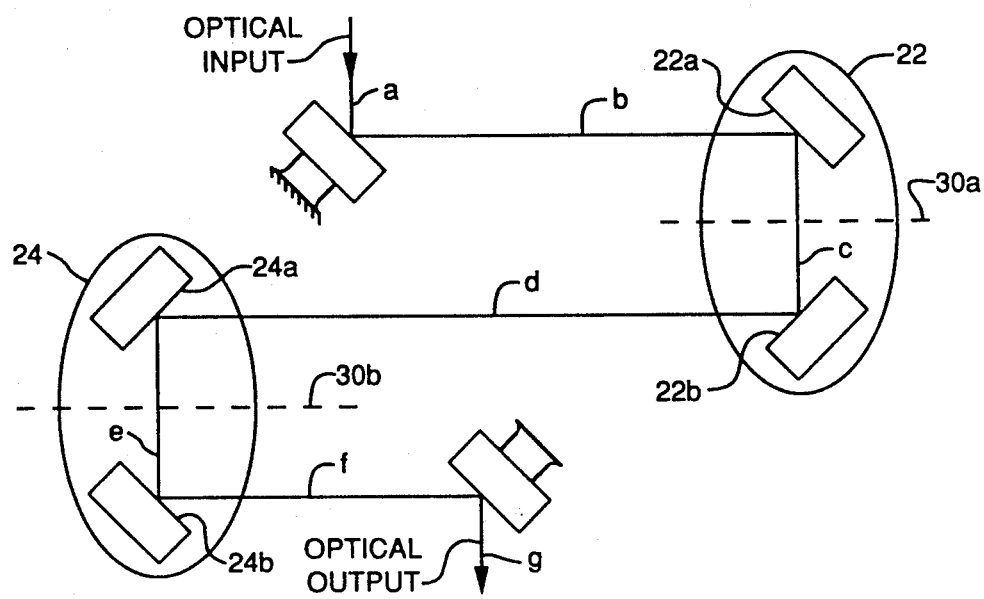

The optical geometry of the prior art system shown in FIG. 3 is essentially the same as that of FIG. 2, except that the pairs of mirrors 22 and 24 translate on two parallel axes 30a and 30b. Again it will be seen that the path segments c and e are not altered as the mirrors are translated and therefore, the path length change is only two times the amount of relative translation of the two pairs of mirrors.

Figure 4:
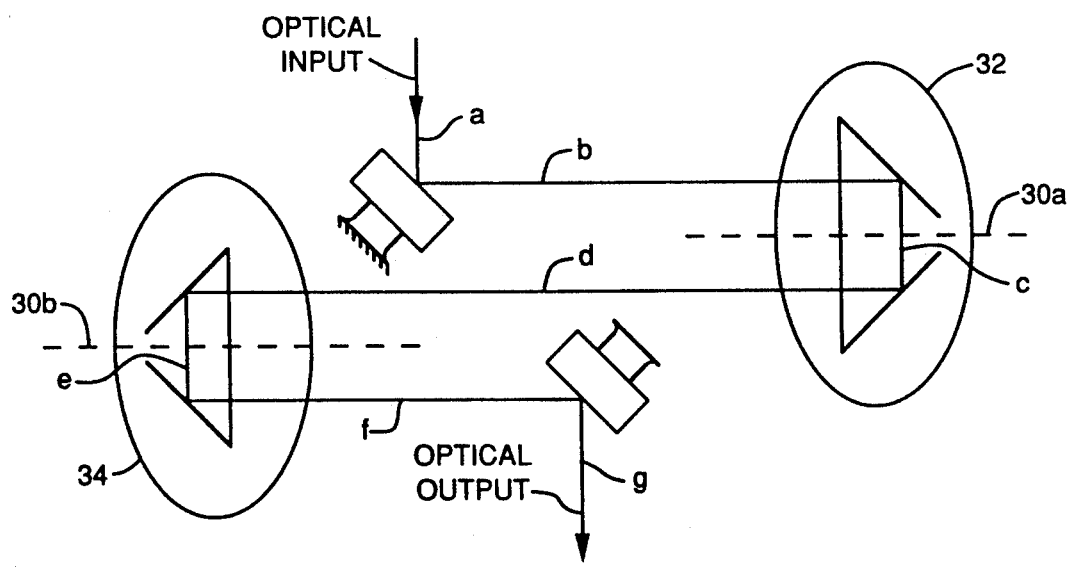

The optical geometry of the prior system of FIG. 4 is identical to that of FIG. 3, except that so-called corner cubes 32 and 34 are substituted for the pairs of mirrors 22 and 24, respectively. As in FIG. 3, the path segments c and e are not altered as the corner cubes are translated and therefore, the path length change is only two times the amount of relative translation of the two corner cubes.

VARIATIONS OF THE INVENTION

Figure 5:
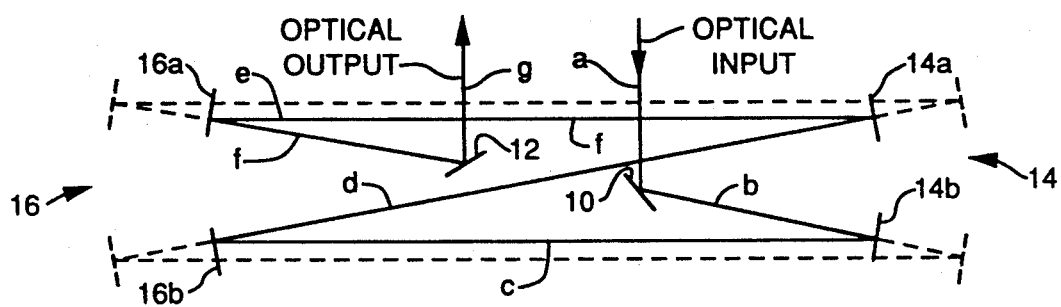
FIGS. 5, 6, and 7 are schematic variations of the invention.

The system illustrated in FIG. 5 uses the same components as those illustrated in FIG. 1, but the input and output mirrors 10 and 12 are placed between mirror pairs. It is noted that the fixed mirrors are set above and below the path segment d, the axis of which remains fixed, although its length changes as the mirror pairs 14 and 16 are moved from the solid line position of the dotted line position.

Figure 6:
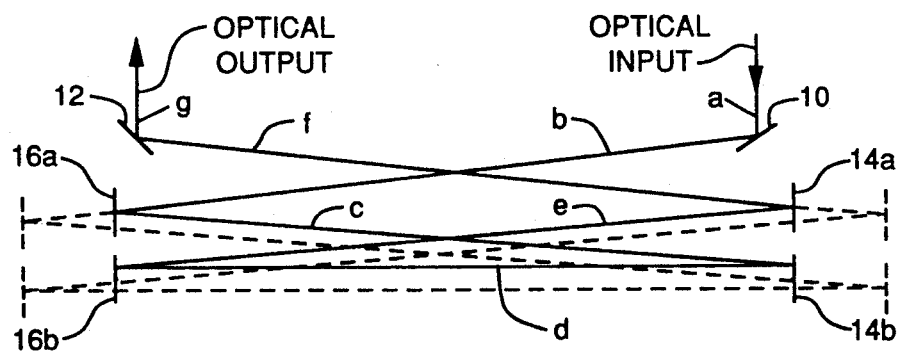

The variation shown in FIG. 6 is very similar to that of FIG. 1, except that the input and output mirrors 10,12 have been spaced apart and the angle of the input and output beam paths have been changed. Because the input and output mirrors are out of the area of the path segments between the mirror pair (i.e., segments b, c, d, and e), each pair of mirrors can be made compact and the path segments can be angularly compressed.

Figure 7:
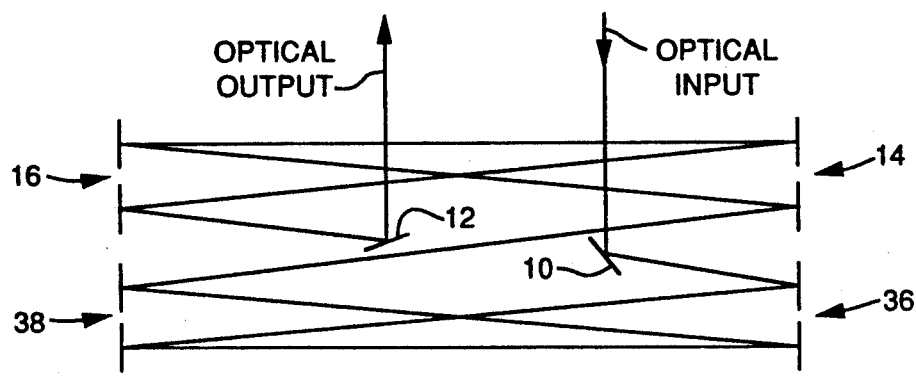

The arrangement shown in FIG. 7 is identical to that of FIG. 4, except that two additional mirror pairs 36 and 38 have been added so as to increase the number of alterable path segments to eight instead of four, and thereby multiplying any translation by a factor of eight.

It is apparent that this invention is subject to many variations and modifications, only a few of which have been described. It is important to note that the path segments between the input and output mirrors are always between mirrors which are oppositely displaced, so that every path segment between the mirrors is altered by displacement of the mirror pairs. It is intended, therefore, that this invention be limited only by the following appended claims as interpreted in the light of the prior art.

What is claimed is:

1. An optical system comprising:
   an optical input comprising a spatially fixed input mirror and an optical output comprising a spatially fixed output mirror;
   first and second assemblies of first and second mirrors, said assemblies being oppositely translatable with respect to each other along parallel lines;
   an optical path between said input and output mirrors, said optical path comprising a plurality of path segments, said path segments extending between said input and output mirrors and said assemblies, each segment of said optical path being between mirrors which are relatively displaced as said assemblies are oppositely translated, whereby each segment is increased or decreased as said assemblies are oppositely translated; and
   wherein said optical path comprises:
   a first segment from said input mirror to the first mirror of said first assembly;
   a second segment from the first mirror of said first assembly to the second mirror of said second assembly;
   a third segment from the second mirror of said second assembly to the second mirror of said first assembly;
   a fourth segment from the second mirror of said first assembly to the first mirror of said second assembly; and
   a fifth segment from the first mirror of said second assembly to said output mirror, each of said segment lengths being increased or decreased as said first and second assemblies of mirrors are oppositely translated.

* * * * *